Oct. 29, 1968          T. G. RAUCH          3,407,920
              FLEXIBLE MATERIAL-CONVEYING CHAIN
Filed April 11, 1967                    2 Sheets-Sheet 1
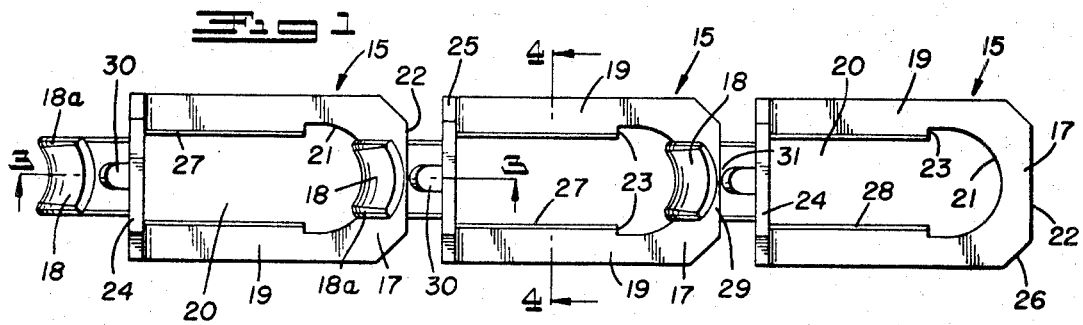
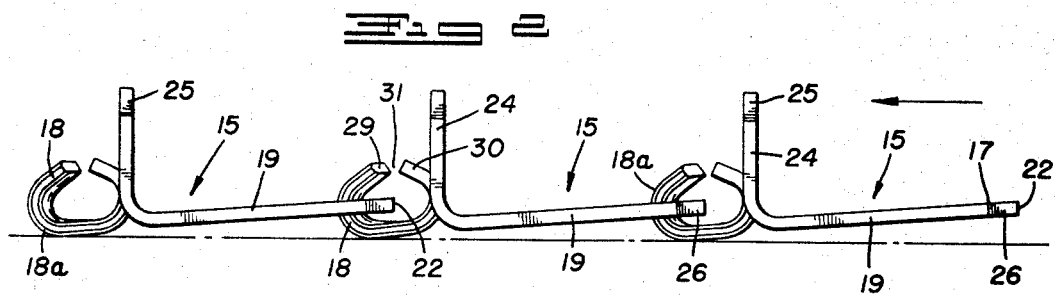
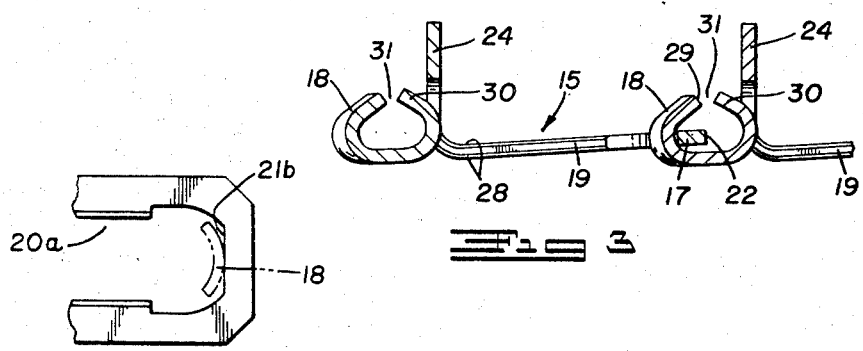
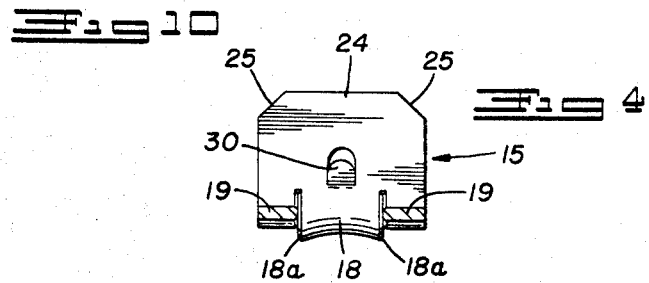
INVENTOR.
THOMAS G. RAUCH
BY
MAHONEY, MILLER & RAMBO
BY
ATTORNEYS

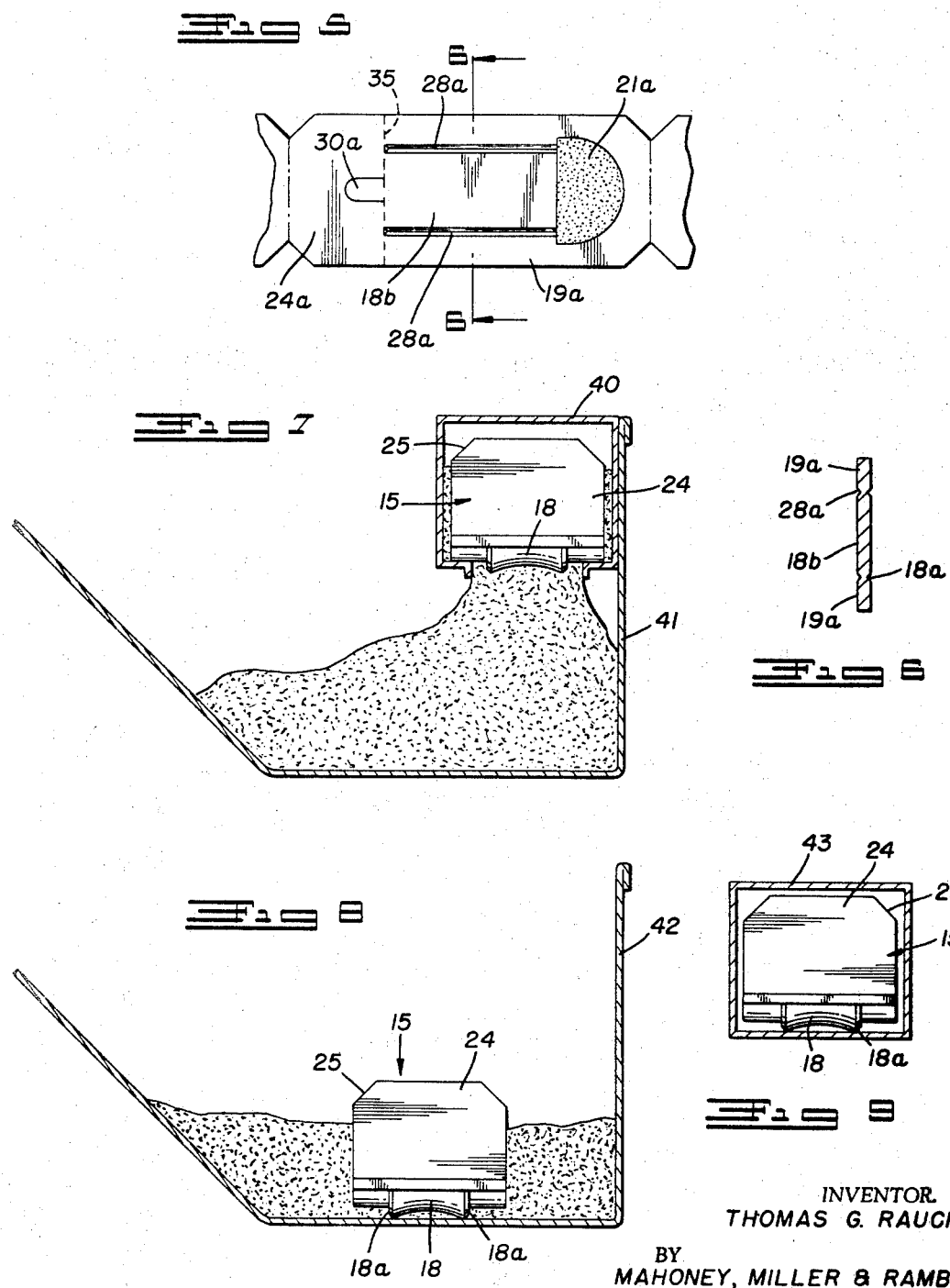

United States Patent Office 3,407,920
Patented Oct. 29, 1968

3,407,920
FLEXIBLE MATERIAL-CONVEYING CHAIN
Thomas G. Rauch, Lancaster, Ohio, assignor to McAuley Manufacturing, Inc., Bremen, Ohio, a corporation of Ohio
Filed Apr. 11, 1967, Ser. No. 630,049
1 Claim. (Cl. 198—168)

ABSTRACT OF THE DISCLOSURE

The present invention relates to a chain which in its general nature is similar to the chain disclosed in the patent to Graetz et al. No. 2,672,059, issued Mar. 16, 1954, being composed of interlocking links, but which is improved in its material-carrying capacity as well as in its structural form so that it can be made in very narrow widths and still have the necessary structural strength. The main improvement in material-carrying capacity is due to the provision of material-engaging and pushing dozer blade provided at one end of each chain link and projecting outwardly from the plane of the body thereof, but not laterally beyond the side edges of the body, and the manner in which the hook-shaped pintle-receiving barrel portion is formed on the body so as to provide longitudinally extending side portions of substantial width on the body which have considerable material-carrying capacity and structural strength while still keeping the overall width of the body to a minimum. These advantages are obtained while still providing maximum flexibility in the chain and providing a link design which results in minimum scrap or waste material in producing it.

---

In the accompanying drawings, I have illustrated links and a chain embodying my invention, a blank from which the links can be made, and examples of how the chain can be used.

FIGURE 1 is a plan view of interlocked links of a length of chain embodying my invention.

FIGURE 2 is an edge elevational view of the length of chain shown in FIGURE 1.

FIGURE 3 is a longitudinal sectional view taken along line 3—3 of FIGURE 1.

FIGURE 4 is a transverse sectional view taken along line 4—4 of FIGURE 1.

FIGURE 5 is a schematic plan view illustrating a blank from which the chain links can be made.

FIGURE 6 is a transverse sectional view taken along line 6—6 of FIGURE 5.

FIGURE 7 is a transverse sectional schematic view illustrating a horizontal feeder trough arrangement in which the chain can be used.

FIGURE 8 is a similar arrangement illustrating a different horizontal feeder trough arrangement in which the chain can be used.

FIGURE 9 is a horizontal sectional view through a vertical feed tube through which the chain may pass.

FIGURE 10 is a plan view of a portion of the chain link showing a somewhat modified shape of the enlarged end of the pintle-receiving aperture.

With reference to the drawings, I have illustrated in FIGURES 1–4 a flexible chain composed of the interlocking links 15 which are so connected together that the links may pivot relative to each other in both vertical and lateral planes, may twist relative to each other about the longitudinal axis of the chain, or may move bodily relative to each other in both planes, to facilitate various changes in directions of travel and prevent jamming of material in the interlocking joints or beneath the chain when it is used in a feed trough or the like.

Each of the links 15 takes the form illustrated and preferably is produced by a die-cutting and stamping operation. Each link consists of a substantially flat body which has a flat pintle-portion 17 at one end and a hook-shaped, pintle-receiving barrel portion 18 at the other end which are joined together by the two integral flat connecting side portions 19. The barrel portion 18 has the corners of both its side edges beveled as indicated at 18a to eliminate sharp edges. This arrangement provides a central longitudinal aperture 20 which is of keyhole form and the particular shape of which is important to this invention. The form of this aperture makes it possible to produce the link with a minimum width of material without waste and still maintain substantial width of the side flat connecting portions 19, this all being accomplished while still keeping the overall width of the body of the link to a minimum. My invention accomplishes these advantages without detracting from the desired relative movements of adjacent interlocked links.

The pintle portion 17 is at the rear end of the link relative to its intended direction of travel, as indicated in FIGURES 1 and 2, and is provided with an inner or forward curved edge 21, and an outer or rear straight edge 22 which extends laterally across the rear end of the body. The curved edge 21 extends forwardly over the side portions 19 to shoulders 23 and then the inner edges 27 of the portions 19 extend straight to the upstanding flight 24, which acts as a dozer blade. The upper and lower corners of the straight inner edges 27 are beveled as at 28 to eliminate sharp edges. The flight or dozer blade 24 is formed integral with the body and is upstanding or outwardly projecting almost at a right angle to the plane of the body of the link. This blade 24 extends completely across the width of the body of the link. It has its upper corners beveled at 25 and the rear corners of the body are similarly beveled at 26 but all of these corners could be rounded instead of beveled.

The pintle-receiving hook-shaped barrel portion 18 is formed on the forward end of the body of the link opposite the end on which the pintle 17 is formed. It is located laterally midway between the opposite side edges of the blade or flight 24. The hook portion extends forwardly in the plane of the body of the link, that is, in the plane of the flat side portions 19, and has an extremity 29 that turns upwardly and then rearwardly toward the forward surface of the blade 24 but terminates short thereof to provide a space therebetween. The hook extremity 29 is curved bodily transversely to provide a leading concave surface and a rear convex surface. Struck forwardly from the blade 24 is a retaining lug or finger 30 which is bent forwardly toward the hook extremity 29 but is spaced slightly therefrom to provide the space 31. This space is of less longitudinal extent than the front to rear extent of the pintle portion 21 and is also less than the thickness of the pintle portion. Thus, accidental unlocking is prevented under normal conditions of use of the chain and separation is permitted if the pintle portion is turned on edge and forced through the space 31.

The chain link may be made from a narrow strip or blank of steel as indicated in FIGURES 5 and 6. It will be slit, as indicated by full lines, to provide the finger-forming tab 30a, and the barrel-producing tongue 18b, both of which are bent out of the plane of the blank along the transverse joint indicated by the dotted line 35. Also, the blade-forming portion 24a is bent upwardly at this line. Slitting to produce the straight edges 27 is preferably accomplished by using a preliminary V-coining operation indicated at 28a in FIGURES 5 and 6 and later snapping out the material to be removed. This coining operation also produces the beveled corners 28 on the straight edges 27 of the slot 20 and the beveled corners 18a on the side edges of the barrel portion 18. Since the portion 18b is the full width of the final barrel portion 18, there is no wastage at this point and the barrel and the remaining side forming portions can still be of substantial width and sufficient strength. Substantially the only portion of material that is wasted is the semicircular slug 21a, which is indicated by shading, and which is stamped from the blank and discarded. This produces the enlarged circular end in the keyhole slot which will receive the hook-shaped barrel on an adjacent link and still permit the necessary movement since the barrel will be substantially less in width than the enlarged arcuate end of the keyhole slot.

In FIGURE 7, I have illustrated how a chain embodying this invention can operate in a narrow tubular housing 40 to feed material through openings in the bottom thereof into a larger open trough 41. In FIGURE 8, I show how the chain may be located on the bottom of a large open trough 42. In both cases, the dozer blades 24 are shown upright but the chain can be used with the blades in dependent position. In each case, the blades 24 will push large amounts of material and the side portions 19 will also carry along large amounts of material. In FIGURE 9, I show the chain disposed in a vertical square tube 43 where the blades 24 will serve to lift the material vertically.

In FIGURE 10, the keyhole aperture 20a is shown as being of different shape at its enlarged end to provide even greater lateral flexibility of the chain. In this instance, the forward edge 21b, instead of being a continuous arc, is provided with a straight transverse mid-section or portion so that, as indicated by broken lines, the barrel 18 of one link will not fully bear against the edge 21b of the other link but will rock transversely on that edge.

Thus, the chain will have great material-carrying capacity. It can be made very narrow without sacrificing strength due to the keyhole slot formation of aperture 20 and without waste of material. Also, because of the enlarged end of the slot, the barrel 18 of the next link will interlock with the pintle portion 17 in such a manner as to permit maximum relative bodily and pivoting movement. The beveled corners 18a of the side edges of barrel portion 18 are important since the barrel portion will, in many installations, slide on the bottom of the trough and, due to the transverse concave bottom surface of the barrel portion, these points 18a would otherwise be sharp corners which would cut into the trough bottom.

Many other advantages will be apparent.

Having thus described this invention, what is claimed is:

1. A chain composed of interlocking links, each of said links comprising a substantially flat body portion with a transversely extending flat pintle-portion at one end and a hook-shaped pintle-receiving barrel portion at its opposite end projecting outwardly substantially in the plane of the body and then outwardly from the plane of the body and turned longitudinally inwardly, a material-pusher blade extending from the plane of the body outwardly in the same direction as said hook-shaped barrel portion and disposed longitudinally inwardly of the barrel portion, but being at an angle to the plane of said body portion, said flat body portion being provided with a slot extending from said pusher blade to said pintle portion which includes a main part of a lateral extent corresponding substantially to that of the hook-shaped barrel portion and having an end adjacent said pintle portion of greater width which is substantially greater than the width of said barrel portion so as to provide for free movement between adjacent links and the provision of side portions of substantial transverse width with a minimum of scrap material, said slot being of keyhole form with straight edges on the narrow portion thereof and an arcuate edge on the enlarged portion thereof with shoulders where the respective edges meet, said arcuate edge forming the inner edge of said pintle portion, and said arcuate edge having a straight transverse mid-section.

References Cited

UNITED STATES PATENTS

| | | | |
|---|---|---|---|
| 3,215,256 | 11/1965 | McAuley | 198—168 |
| 3,225,895 | 12/1965 | Reimers | 198—168 |
| 3,262,548 | 7/1966 | McAuley et al. | 198—173 |

EDWARD A. SROKA, *Primary Examiner.*

R. J. HICKEY, *Assistant Examiner.*